US007983225B2

(12) United States Patent
Dean et al.

(10) Patent No.: US 7,983,225 B2
(45) Date of Patent: Jul. 19, 2011

(54) WIRELESS NETWORK BEACON TIMING

(75) Inventors: Frederick Dean, Wilmette, IL (US); Devabhaktuni Srikrishna, Sunnyvale, CA (US); Saar Gillai, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 1042 days.

(21) Appl. No.: 11/731,407

(22) Filed: Mar. 30, 2007

(65) Prior Publication Data

US 2008/0240055 A1    Oct. 2, 2008

(51) Int. Cl.
*H04J 3/00* (2006.01)
(52) U.S. Cl. ...................................... 370/336
(58) Field of Classification Search .................. 370/336
See application file for complete search history.

(56) References Cited

U.S. PATENT DOCUMENTS

| 5,654,959 | A | 8/1997 | Baker et al. |
|---|---|---|---|
| 6,671,525 | B2 | 12/2003 | Allen et al. |
| 6,732,176 | B1 | 5/2004 | Stewart et al. |
| 6,791,996 | B1 | 9/2004 | Watanabe et al. |
| 6,980,819 | B2 | 12/2005 | Sugaya et al. |
| 2006/0268746 | A1* | 11/2006 | Wijting et al. ............... 370/254 |

* cited by examiner

*Primary Examiner* — Marivelisse Santiago-Cordero
(74) *Attorney, Agent, or Firm* — Brian R. Short

(57) ABSTRACT

An apparatus and method of a wireless network timing transmission of multiple BSSID beacons is disclosed. The method includes identifying multiple personalities of the wireless network, wherein a separate MAC address corresponding with each of the personalities. A beacon type is assigned for each of the personalities. During each transmission interval, a plurality of the beacon types are consecutively transmitted, wherein the different beacon types are consecutively spaced during transmission by a predetermined inter-frame spacing, wherein the predetermined inter-frame spacing is substantially less than an air-time duration of each transmission interval.

17 Claims, 7 Drawing Sheets

WIRELESS NETWORK BEACON TIMING

FIELD OF THE EMBODIMENTS

The described embodiments relate generally to wireless communications. More particularly, the described embodiments relate to a method and apparatus for timing wireless network transmission of multiple beacons.

BACKGROUND

Wireless networks are gaining popularity because wireless infrastructures are typically easier and less expensive to deploy than wired networks. However, wireless networks can be susceptible to environmental conditions, interference and self-interference.

Access points of wireless networks can provide client devices with wireless access to the networks. For example, FIG. 1 shows a wireless network that includes access points 120, 122, 124. The access points 120, 122, 124 are typically wire connected to a wired network 110 that is connected to the internet 100.

Typically, wireless access points (such as access points 120, 122, 124) transmit MAC (media access control) addresses, such as, BSSID (base service set identification) beacons (1A-1N, 2A-2N, 3A-3N) that provide a client device with information, for example, regarding networks that the wireless access points support. Based upon the received BSSID beacons, the client device can select which access points, and therefore, which networks to associate with. The transmission of the BSSID beacons, however, occupies valuable transmission air-time. That is, the transmission of the BSSID beacons occupies transmission air-time that can reduce the usability of the air-time to other types of wireless communications.

FIG. 2 shows a time-line and depicts BSSID beacons being randomly transmitted from multiple access nodes. The spacing of the BSSIDs can be such that they reduce the usable air-time space available for other wireless network transmissions. That is, for example, medium access protocols such as 802.11 implement Carrier Sense Multiple Access with Collision Avoidance (CSMA/CA). In such protocols, transceivers sense a channel (link) and defer transmissions while the channel is considered to be busy. The channel is deemed to be busy if a received signal exceeds a Clear Channel Assessment Threshold (CCAT). Once the CCAT has been tripped, the 802.11 devices can no longer transmit any signals. Therefore, an 802.11 device in the presence of many randomly transmitted beacons can be limited to transmitted data in a very limited amount of air-time.

For a wireless network that includes a high density of access points (access nodes), such as a wireless mesh network, the air-time occupied by the BSSID beacons transmitted by the access nodes can become undesirably large, and effectively reduce the usable air-time of the wireless network.

It is desirable for a wireless network to transmit multiple BSSID beacons without prohibitively reducing the usable airtime available to devices of the wireless network.

SUMMARY

One embodiment includes a method of a wireless network timing transmission of multiple beacons. The method includes identifying multiple personalities of the wireless network, wherein a separate MAC address corresponds with each of the personalities. A beacon type is assigned for each of the personalities. During each transmission interval, a plurality of the beacon types are consecutively transmitted, wherein the different beacon types are consecutively spaced during transmission by a predetermined inter-frame spacing, wherein the predetermined inter-frame spacing is substantially less than an air-time duration of each transmission interval.

Another embodiment includes a method of a wireless access node within a wireless mesh network timing transmission of multiple BSSID beacons. The method includes the access node identifying multiple personalities of the wireless mesh network, wherein a separate MAC address corresponding with each of the personalities. The access node assigns a beacon type for each of the personalities. During each transmission frame, the access node consecutively transmits a plurality of the beacon types, wherein the different beacon types are consecutively spaced during transmission by a predetermined period. The predetermined period is substantially less than a time duration of each transmission frame.

Other aspects and advantages of the described embodiments will become apparent from the following detailed description, taken in conjunction with the accompanying drawings, illustrating by way of example the principles of the described embodiments.

DETAILED DESCRIPTION

Figure 1:
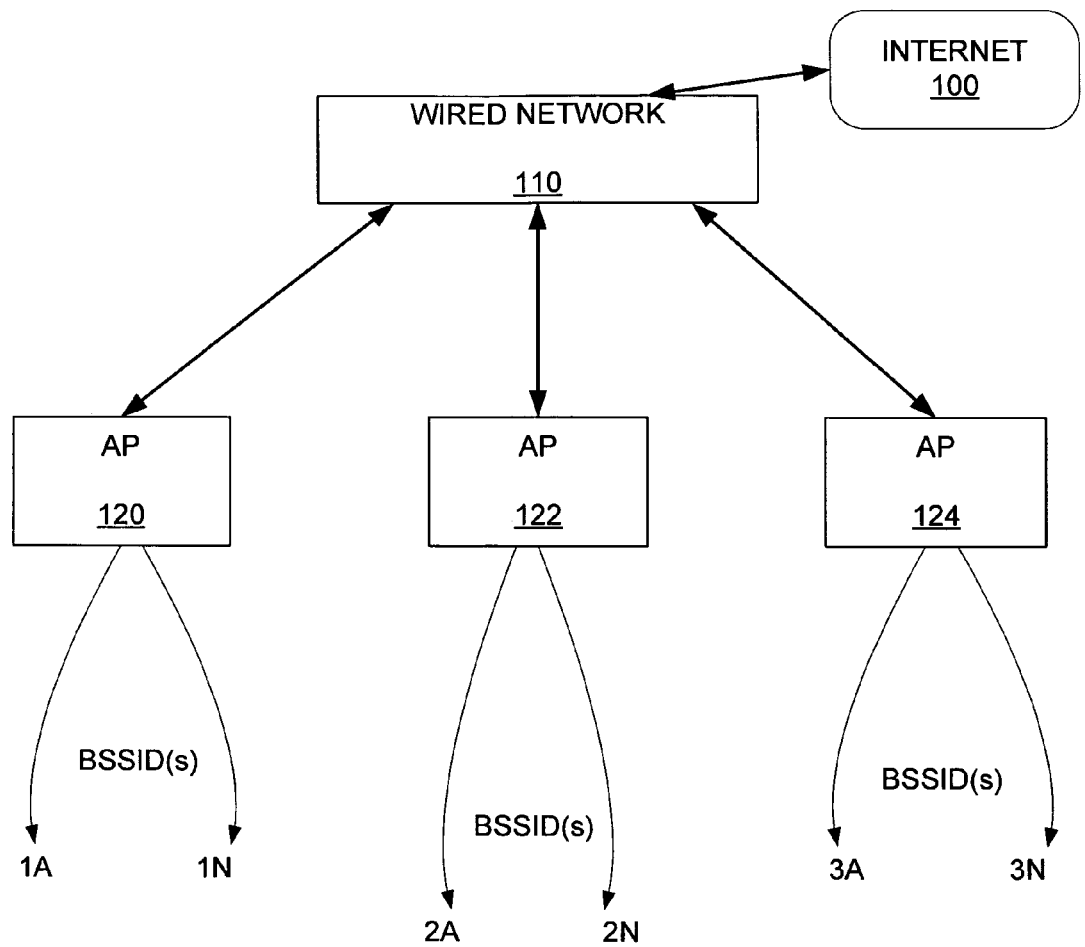
FIG. 1 shows a wireless network in which access points of the wireless network each broadcast beacons.
Figure 2:
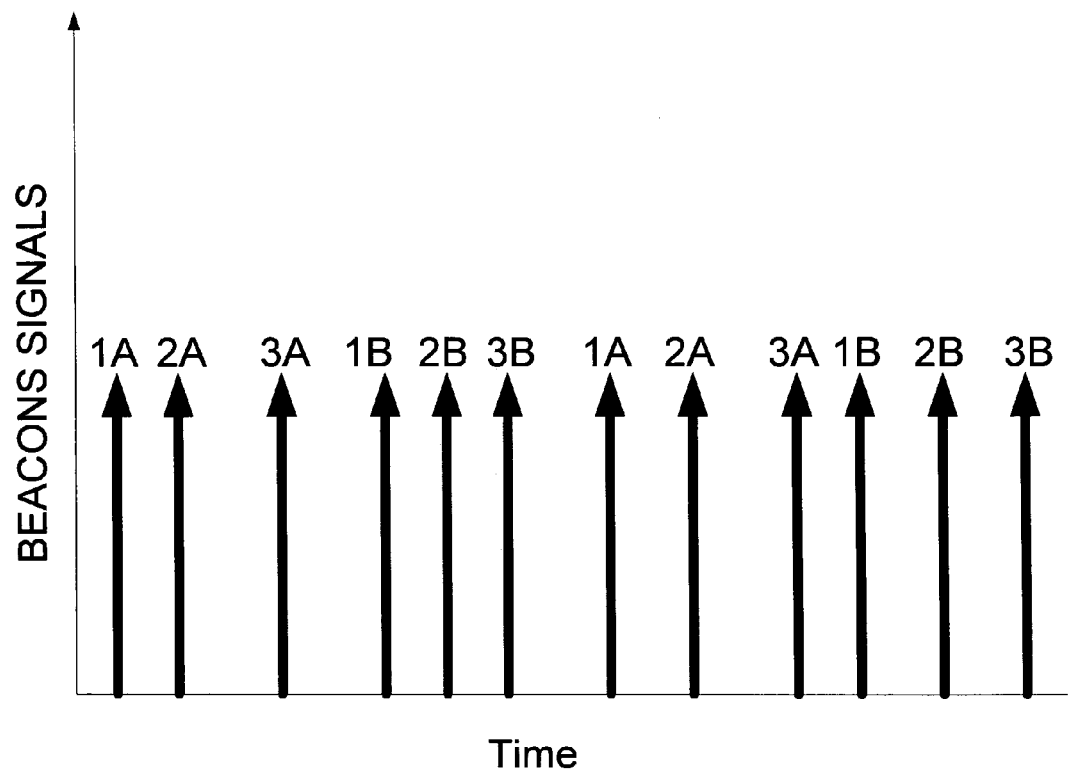
FIG. 2 is a time-line showing multiple beacon types being broadcast from multiple wireless access points.

As shown in the drawings for purposes of illustration, the described embodiments are embodied in an apparatus and method for timing transmissions of multiple beacons, resulting in more air-time capacity than if the beacons are transmitted at random times. The beacons can be ordered according to perceived importance, to increase the likelihood the higher ranked beacons are successfully transmitted. The beacons can include, for example, BSSID beacons.

Figure 3:
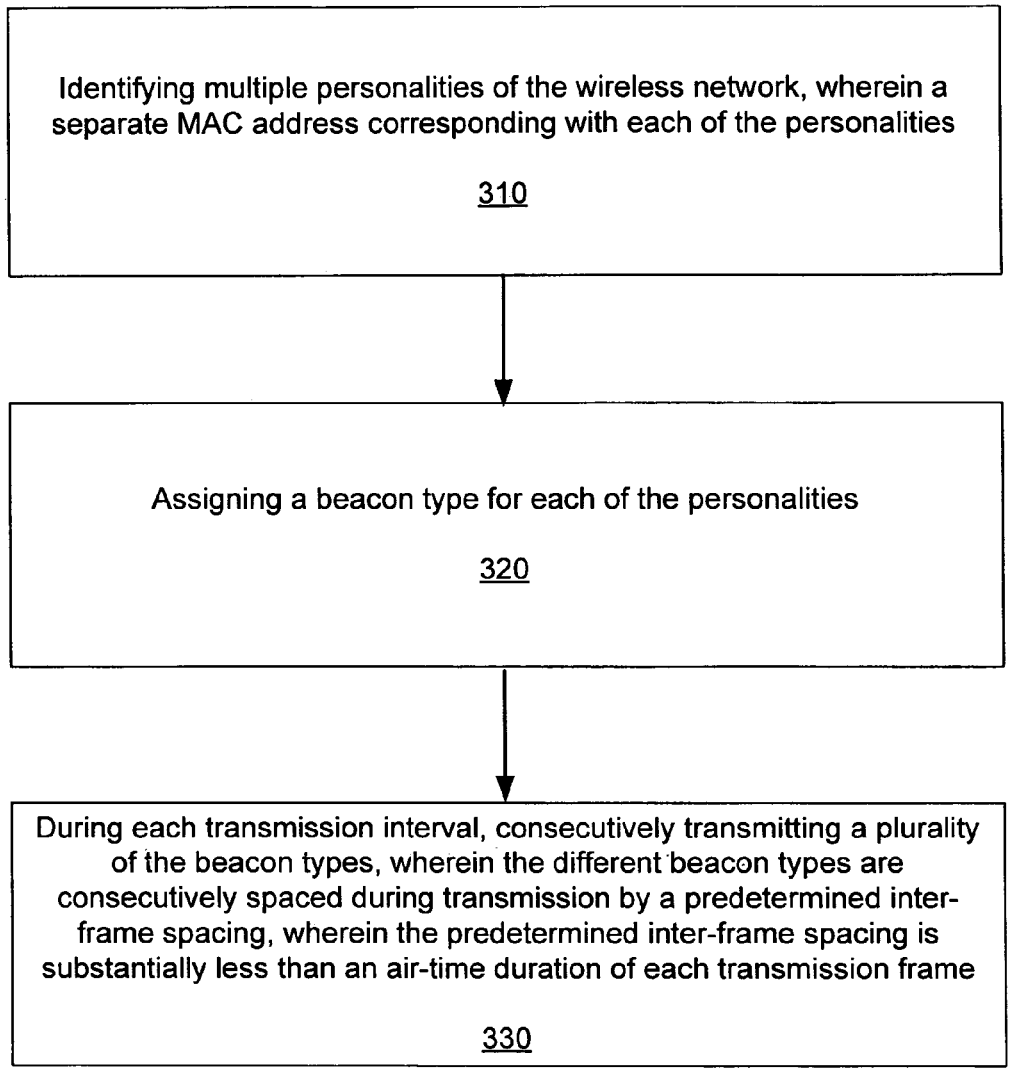
FIG. 3 is a flow chart that includes steps of one example of a method of a wireless network timing transmission of multiple beacons.

FIG. 3 is a flow chart that includes steps of one example of a method of a wireless network timing transmission of multiple beacons. A first step 310 of the method includes identifying multiple personalities of the wireless network, wherein a separate MAC address corresponding with each of the personalities. A second step 320 includes assigning a beacon type for each of the personalities. A third step 330 includes during each transmission interval, consecutively transmitting a plurality of the beacon types, wherein the different beacon types are consecutively spaced during transmission by a predetermined inter-frame spacing, wherein the predetermined inter-frame spacing is substantially less than an air-time duration of each transmission frame.

The different personality types can be defined by an authentication type (for example, Wired Equivalent Privacy (WEP), Open, Wi-Fi Protected Access (WPA), WPA2), a Wireless Mutimedia Extensions (WME), Wi-Fi Multimedia (WMM), backend services, such as, service provided and the network connected to, and the allowable bandwidth. As previously stated, each personality type has its own MAC address. Additionally, beacon types can provide Extended Service Set IDs (ESSIDs), and features and symbol rates supported.

To minimize air-time occupancy by the beacons, the inter-frame spacing can be maintained below a threshold. For example, the predetermined inter-frame spacing can be maintained to be less than a tenth of the air-time duration of each transmission frame. By reducing and controlling the inter-frame spacing between the different beacon types, the transmission of the beacons is effectively "clumped" or "bunched" into a relatively small span of time. The result is an increase in the available air-time as compared to the situation where the beacons are randomly transmitted.

The transmission interval can be defined by an 802.11 frame. Furthermore, the plurality of beacon types can be consecutively spaced during transmission by a short inter-frame (SIF) space. For an 802.11 frame, the duration field of the 802.11 frame can be set to a non-zero duration. The duration generally should be long enough to cover subsequent beacons of a group or bunch.

Figure 4:
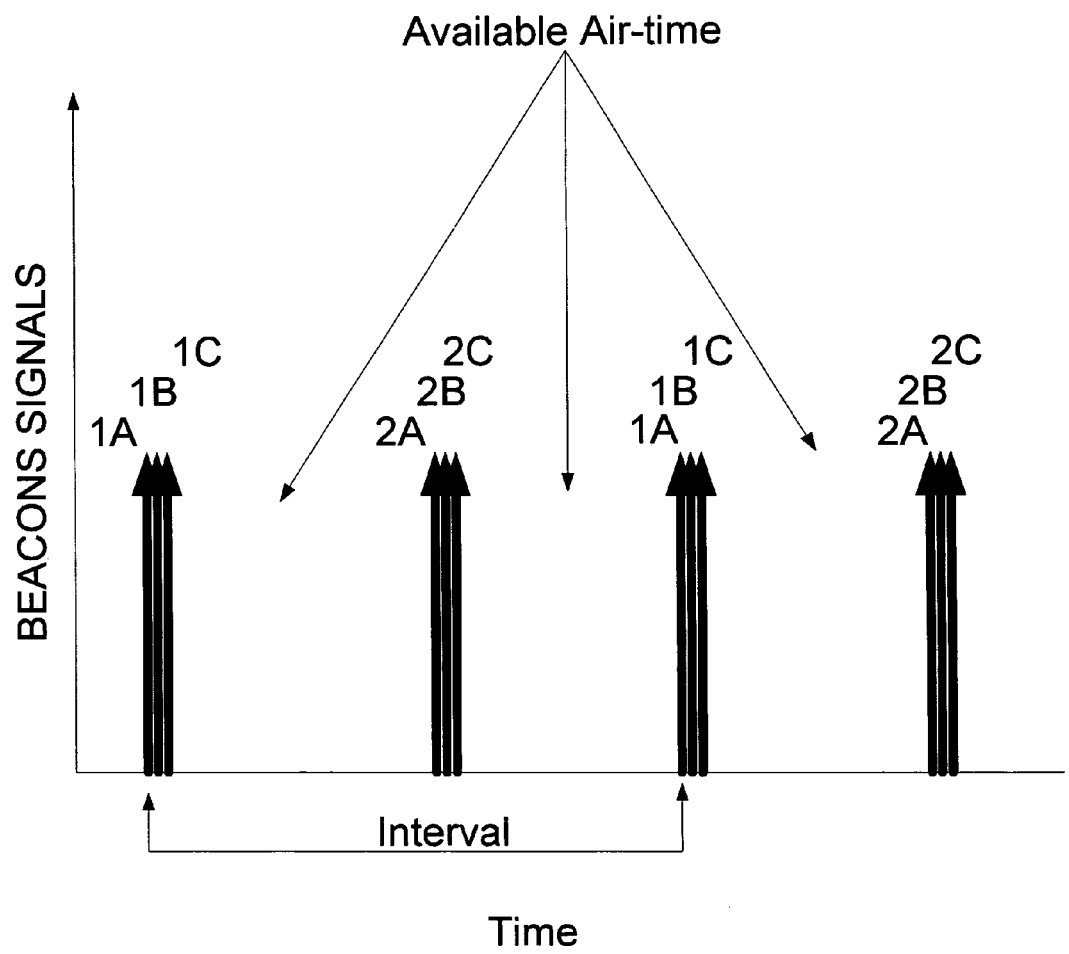
FIG. 4 shows a time-line of multiple beacon types being broadcast from multiple wireless access points, wherein the timing of the broadcasts are controlled to improve air-time capacity of the wireless network.

FIG. 4 shows a time-line of multiple beacon types being broadcast from multiple wireless access points, wherein the timing of the broadcasts are controlled to improve air-time capacity of the wireless network. The transmission of each beacon is indicated by an arrow. A first group of beacons 1A, 1B, 1C depicts beacons types A, B, C transmitted from a node 1. As shown the beacons are grouped. The inter-frame spacing is the spacing between the arrows. The air-time duration of the beacons (transmission frame) is indicated by the thickness of each of the arrows. As previously described, an embodiment includes the inter-frame spacing being substantially less than the air-time duration. One specific embodiment includes the predetermined inter-frame spacing being less than a tenth of the air-time duration of each transmission frame.

A second group of beacons 2A, 2B, 2C depicts beacons types A, B, C transmitted from a node 2. As shown the beacons are grouped, and again, the inter-frame spacing is substantially less than the air-time duration.

The next group of beacons 1A, 1B, 1C of beacons are again transmitted from the node 1, but indicate a new transmission interval. As previously described, the transmission interval can be defined by an 802.11 frame. Furthermore, the plurality of beacon types can be consecutively spaced during transmission by a short inter-frame (SIF) space. For an 802.11 frame, the duration field of the 802.11 frame can be set to a non-zero duration.

Figure 5:
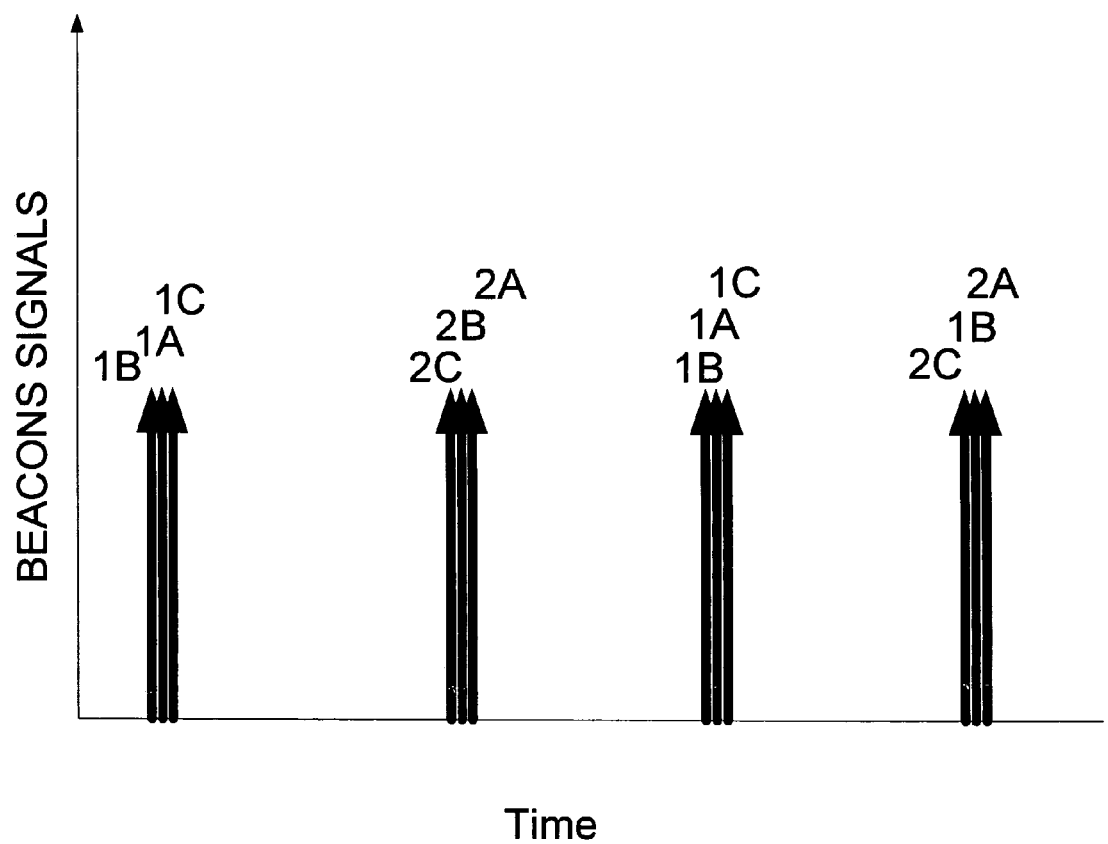
FIG. 5 shows another time-line of multiple beacon types being broadcast from multiple wireless access points, wherein the timing of the broadcasts are ranked, and controlled to improve air-time capacity of the wireless network.

FIG. 5 shows another time-line of multiple beacon types being broadcast from multiple wireless access points, wherein the timing of the broadcasts are ranked, and controlled to improve air-time capacity of the wireless network. This time-line, shows the beacon having been ranked, and transmitted in an order that is set by the ranking. For example, the beacons transmitted from the node 1 are ranked 1B, 1A, 1C and the beacons transmitted from the node 2 are ranked 2C, 2B, 2A. The ranking can be made by the order of perceived importance of the beacons.

More specifically, an embodiment includes ranking the multiple personalities, and consecutively transmitting the plurality of beacons types in an order defined by the ranking. The beacons that are transmitted at the end of the group of transmitted beacons can be more reliably transmitted. Therefore, it can be desirable to transmit the most important beacon types last. As shown in FIG. 5, the node 1 perceives the beacon 1C to be of the greatest importance, and the node 2 perceives the beacon 2A to be of the greatest importance. In a similar fashion, the node 1 perceives the beacon 1B to be the least important, and the node 2 perceives the beacon 2C to be the least important.

The longer the beacons, the more likely it is they will be interfered with. Therefore, it can be additionally desirable to transmit the longer length (longer in time) beacons last within a group. An embodiment includes consecutively transmitting the plurality of beacon types according to an average length of each of the beacon types. A more specific embodiment includes consecutively transmitted according to average length, wherein shorter length beacon types are transmitted first and longer length beacon types are transmitted last.

Comparing average lengths of the beacons can be advantageous in setting the rankings. That is, the lengths of the beacon types can vary slightly over time, and it is desirable not to be re-ranking the importance of the beacons repeatedly. By using an average length of each beacon type over a period of time, the rankings are less likely to change much over time, and the rankings are more likely to be static over time.

BSSID Beacon Timing within a Wireless Mesh Network

Figure 6:
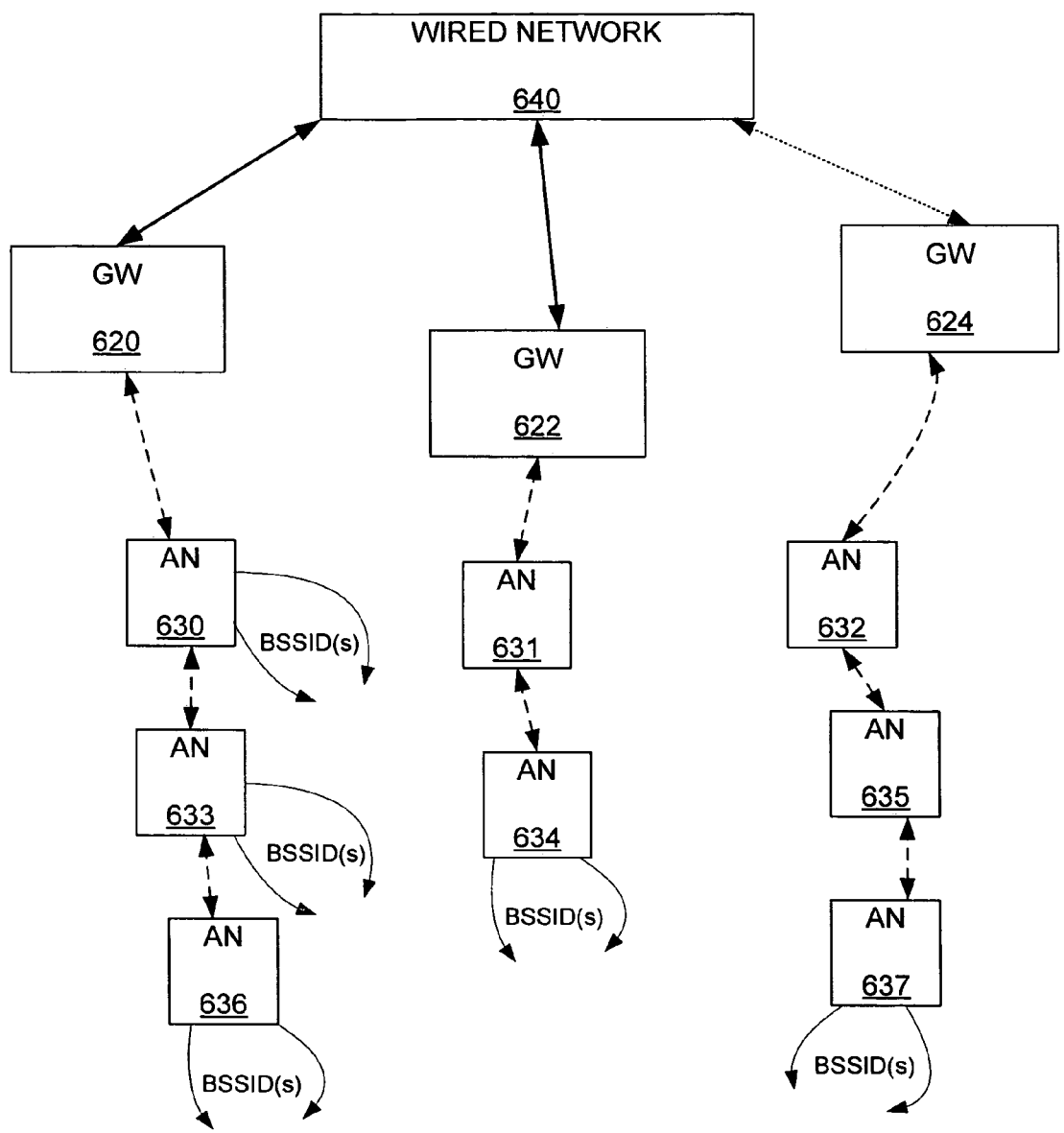
FIG. 6 shows one example of a wireless mesh network that includes access nodes that control timing of the transmission of multiple beacon types.

FIG. 6 shows a wireless mesh network that includes access nodes that each control timing of broadcast beacons. Wireless mesh networks include many transmitting devices (gateways and access nodes) that can each be broadcasting BSSID beacons. As a result, wireless mesh networks can be particularly susceptible to the air-time availability problems that randomly broadcasting BSSID beacons can cause. The methods of increasing available air-time by timing the broadcasting of BSSID beacons is particularly useful for wireless mesh networks.

For an embodiment of a wireless mesh network, the beacons can be used for distributing routing information within the wireless mesh network. That is, the wireless mesh network can be constructed in which the routing information exchanged between routers is included, for example, within 802.11 beacons to reduce frame count. Routing information is typically regarded as the most important information to be conveyed within the wireless mesh network. Therefore, an embodiment include routing information within beacons being ranked the most important of all beacons transmitted by the nodes of the wireless mesh network, and therefore, are transmitted as the very last beacon of a group of beacons transmitted by the nodes.

An alternate embodiment can be motivated by a different reason. More specifically, the beacon rankings can alternatively be set to provide client with the highest priority. That is, the client beacons may be deemed more important than routing beacons. In this situation, the routing beacons may be given the lowest ranking, and routing information may be put into the least important BSSID beacons.

The wireless mesh network includes gateways 620, 622, 624 and access nodes 630, 631, 632, 633, 634, 635, 636, 637. Client devices can connect to a wired network 640 through the gateways 620, 622, 624 and access nodes 630, 631, 632, 633, 634, 635, 636, 637.

The gateways 620, 622, 624 can be wirelessly or wire connected to the wired network 640. The gateways 620, 622, 624 can also be access nodes or access points in that the gateways 620, 622, 624 can directly provide client devices with access to the wired network 640.

Routing Selections

The quality of an upstream path from an access node to a gateway can be determined during routing selection by the access node. An embodiment of the mesh network includes gateways originating and broadcasting routing beacons at a predetermined rate (such as 4 beacons per second). Each first level access node (such as access nodes 630, 631, 632) receive routing beacons from at least one of the gateways. By knowing the original rate in which the beacons are broadcast from the gateways, and the rate at which routing beacons are successfully received, the receiving access node can determined the persistence of successfully received routing beacons. An embodiment includes each first level access node selecting an upstream gateway based on a persistence of successfully received routing beacons.

Each first level access node can then rebroadcast the successfully received routing beacons. The rebroadcast beacons can include additional information allowing second level access nodes that receive the rebroadcast routing beacons to determine a routing path back to a gateway. The additional information can include identification (for example, an address) of the first level access node or a hop count (hop count indicates the number of wireless links an access node is from a gateway).

The mesh network can include any number of gateways and any number of access nodes. The number of wireless hops include within the wireless mesh network is not limited.

As previously stated, the persistence of received routing beacons can be used to select a routing path to a gateway. The persistence reflects that quality of the routing path to a gateway, and can be used to provide routing path quality within probe responses transmitted by each access node.

The routing path quality can be determined in both the downstream direction (away from the default gateway) and the upstream direction (towards the default gateway). The downstream quality can be determined by receiving routing beacons as described. The upstream quality can be determined by an upstream device (access node or gateway) receiving routing beacons from the downstream access node, determining the persistence of successfully received beacons, and then including this information in the beacons that the upstream device broadcasts, and are received by the downstream access node.

Each second level access node (such as access nodes 633, 634, 637) receive routing beacons from at least one of the first level access nodes. By knowing the original rate in which the beacons are broadcast from the gateways, and the rate at which routing beacons are successfully received, the receiving access node can determined the persistence of successfully received routing beacons. An embodiment includes each second level access node selecting a first level access node based on a persistence of successfully received routing beacons.

Figure 7:
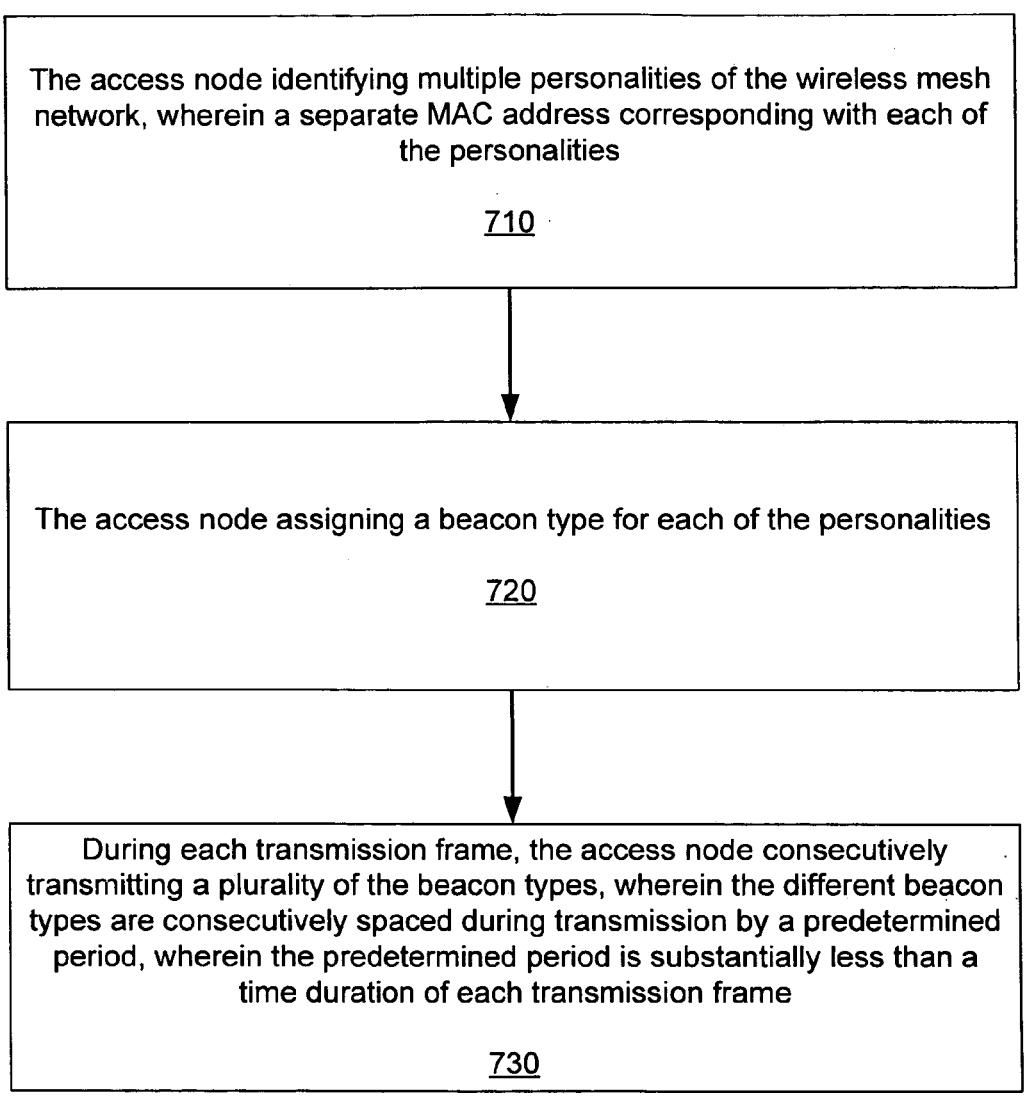
FIG. 7 show one example of a method of a wireless access node within a wireless mesh network timing transmission of multiple BSSID beacons.

FIG. 7 show one example of a method of a wireless access node within a wireless mesh network timing transmission of multiple BSSID beacons. A first step 710 of the method includes the access node identifying multiple personalities of the wireless mesh network, wherein a separate MAC address corresponding with each of the personalities. A second step 720 includes the access node assigning a beacon type for each of the personalities. A third step 730 of the method includes during each transmission frame, the access node consecutively transmitting a plurality of the beacon types, wherein the different beacon types are consecutively spaced during transmission by a predetermined period, wherein the predetermined period is substantially less than a time duration of each transmission frame.

An Embodiments of Beacon Timing Computer Program

An embodiment includes a computer program operable on an access node router of a wireless network. When executed, the computer program performs the following steps: identifying multiple personalities of the wireless network, wherein a separate MAC address corresponding with each of the personalities, assigning a beacon type for each of the personalities, and during each transmission interval, consecutively transmitting a plurality of the beacon types, wherein the different beacon types are consecutively spaced during transmission by a predetermined inter-frame spacing, wherein the predetermined inter-frame spacing is substantially less than an air-time duration of each transmission frame.

Although specific embodiments of the invention have been described and illustrated, the invention is not to be limited to the specific forms or arrangements of parts so described and illustrated. The invention is limited only by the appended claims.

What is claimed:

1. A method of a wireless network timing transmission of multiple beacons, comprising:
   identifying multiple personalities of the wireless network, wherein a separate media access control (MAC) address corresponds with each of the personalities;
   assigning a beacon type for each of the personalities;
   ranking the beacon types; and
   during a transmission interval, consecutively transmitting a plurality of the beacon types in an order defined by the ranking, wherein beacon types ranked to be most important are transmitted last, wherein the beacon types are consecutively spaced during transmission by a predetermined inter-frame spacing, wherein the predetermined inter-frame spacing is substantially less than an air-time duration of a transmission frame.

2. The method of claim 1, wherein the predetermined inter-frame spacing is less than a tenth of the air-time duration of each transmission frame.

3. The method of claim 1, wherein the transmission interval is an 802.11 frame.

4. The method of claim 3, wherein the plurality of beacon types are consecutively spaced during transmission by a short inter-frame space.

5. The method of claim 3, further comprising setting a duration field of the 802.11 frame to a non-zero duration.

6. A method of a wireless network timing transmission of multiple beacons, comprising:
   identifying multiple personalities of the wireless network, wherein a separate media access control (MAC) address corresponds with each of the personalities;
   assigning a beacon type for each of the personalities; and
   during a transmission interval, consecutively transmitting a plurality of beacon types according to an average length of each of the beacon types, wherein the beacon types are consecutively spaced during transmission by a predetermined inter-frame spacing, wherein the predetermined inter-frame spacing is substantially less than an air-time duration of a transmission frame.

7. The method of claim 6, wherein the beacon types are consecutively transmitted according to average length, wherein shorter length beacon types are transmitted first and longer length beacon types are transmitted last.

8. A method of a wireless network timing transmission of multiple beacons, comprising:
- identifying multiple personalities of the wireless network, wherein a separate media access control (MAC) address corresponds with each of the personalities;
- assigning a beacon type for each of the personalities;
- determining an average length of beacon groups of each of the beacon types; and
- during a transmission interval, transmitting the beacon types in order of the average beacon length of the corresponding beacon groups, wherein the beacon types are consecutively spaced during transmission by a predetermined inter-frame spacing, wherein the predetermined inter-frame spacing is substantially less than an air-time duration of a transmission frame.

9. The method of claim 8, wherein shortest length beacons are transmitted first and longest beacon groups are transmitted last.

10. A method of a wireless access node within a wireless mesh network timing transmission of multiple base service set identification (BSSID) beacons, comprising:
- the access node identifying multiple personalities of the wireless mesh network, wherein a separate media access control (MAC) address corresponds with each of the personalities;
- the access node assigning a beacon type for each of the personalities;
- ranking the beacon types; and
- during a transmission interval, consecutively transmitting a plurality of the beacon types in an order defined by the ranking, wherein beacon types ranked to be most important are transmitted last, wherein the beacon types are consecutively spaced during transmission by a predetermined inter-frame spacing, wherein the predetermined inter-frame spacing is substantially less than an air-time duration of a transmission frame.

11. The method of claim 10, wherein the predetermined period is less than a tenth of the time duration of each transmission frame.

12. The method of claim 10, wherein the transmission frame is an 802.11 frame.

13. The method of claim 12, wherein the different beacon types are consecutively spaced during transmission by a short inter-frame space.

14. The method of claim 12, further comprising setting a duration field of the 802.11 frame to a non-zero duration.

15. The method of claim 10, wherein beacon types ranked most important include routing information.

16. The method of claim 10, further comprising:
- consecutively transmitting the plurality of beacon types according to an average length of each of the beacon types.

17. The method of claim 16, wherein the beacon types are consecutively transmitted according to average length, wherein shorter length beacon types are transmitted first and longer length beacon types are transmitted last.

* * * * *